INVENTOR
Reginald Catherall
BY
*Stewart F. Moore*
ATTORNEY

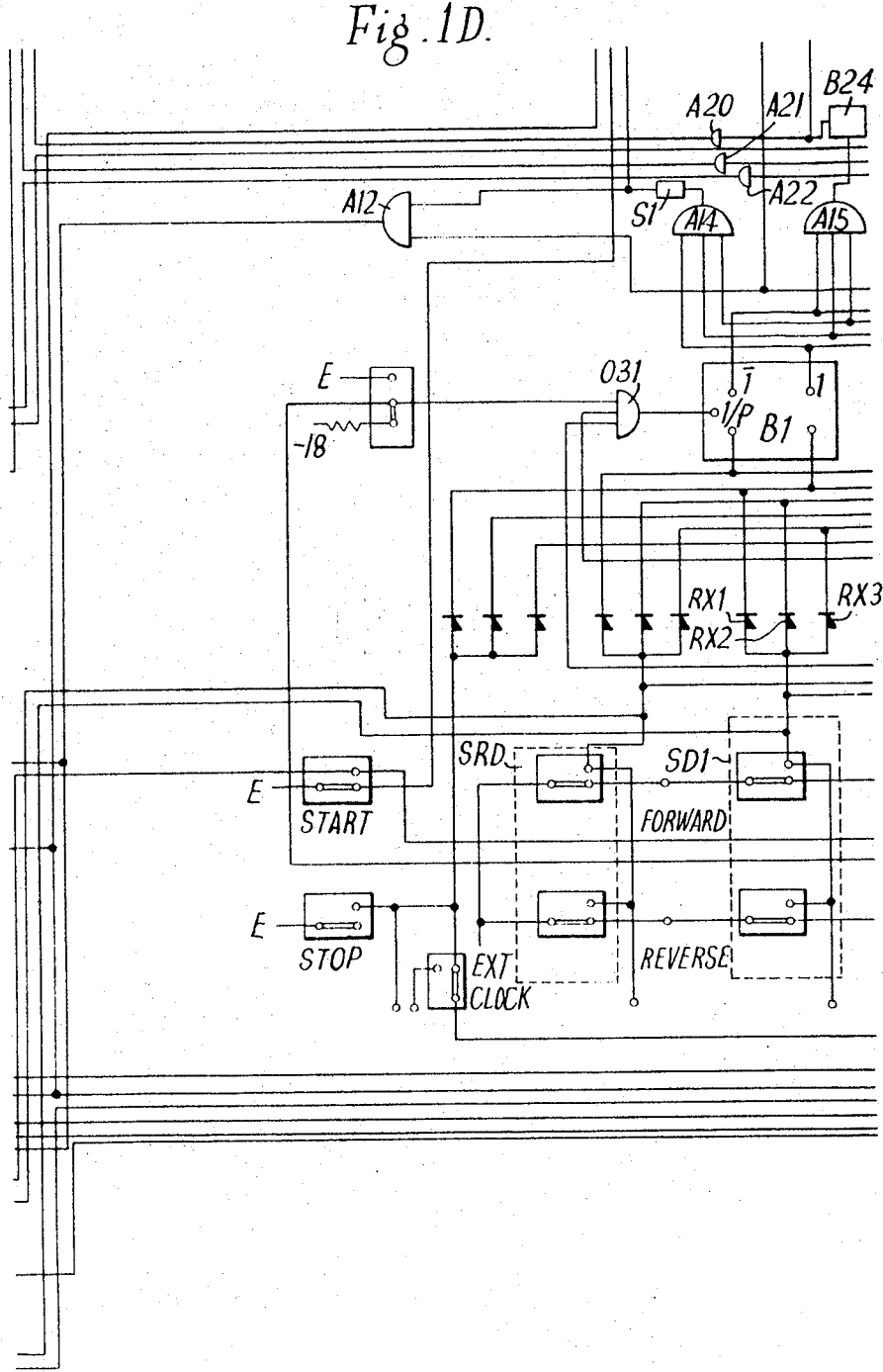

Aug. 19, 1969  R. CATHERALL  3,462,587
DIGITAL INSTRUMENTS HAVING A CONTROL UNIT
WITH VARIOUS PLUG-IN SUB-UNITS
Filed Dec. 30, 1965  15 Sheets-Sheet 9
Fig. 1J.
| FIG 1A | FIG 1C | FIG 1E | FIG 1G |
|--------|--------|--------|--------|
| FIG 1B | FIG 1D | FIG 1F | FIG 1H |
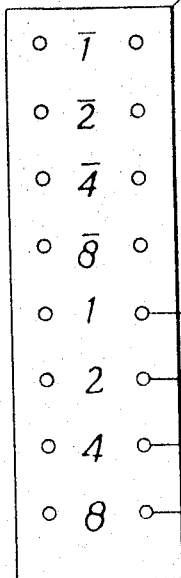
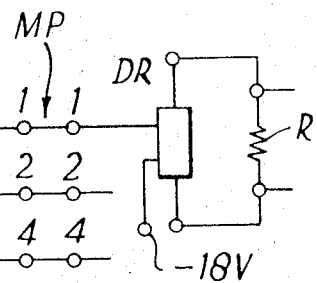
Fig. 2.

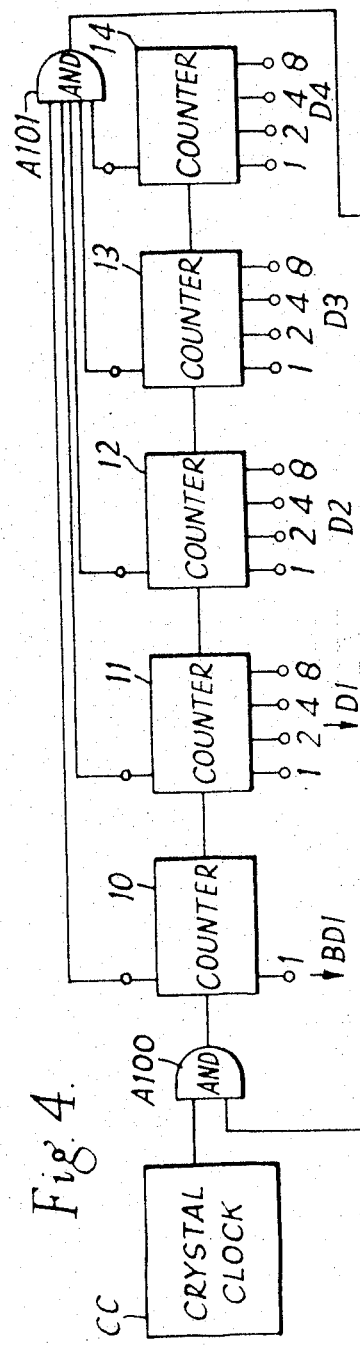
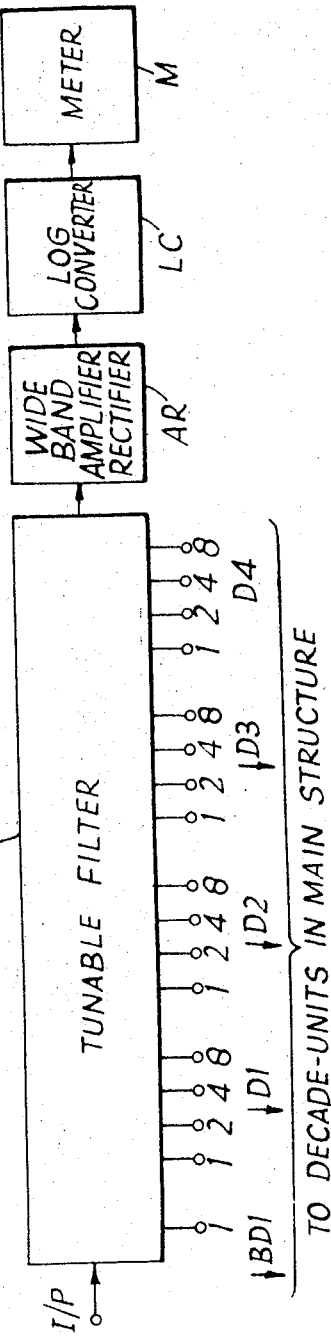
Fig. 4.
Fig 5

United States Patent Office 3,462,587
Patented Aug. 19, 1969

3,462,587
DIGITAL INSTRUMENTS HAVING A CONTROL
UNIT WITH VARIOUS PLUG-IN SUB-UNITS
Reginald Catherall, Woking, Surrey, England, assignor to The Solartron Electronic Group Limited, Farnborough, Hampshire, England, a corporation of the United Kingdom
Filed Dec. 30, 1965, Ser. No. 526,931
Claims priority, application Great Britain, Jan. 4, 1965, 307/65
Int. Cl. G06f 7/38; G06k 15/18
U.S. Cl. 235—151.31
9 Claims

ABSTRACT OF THE DISCLOSURE

A digital instrument comprising a control unit and various plug-in sub-units wherein the sub-units can selectively be combined with the central unit for making up one of a variety of digital instruments such as a digitally controlled voltage supply, a digitally controlled frequency supply, a digitally controlled resistance bridge and the like. The central control unit contains counters, clock sources, dividers, and logic elements for accepting and appropriately interacting with the selected sub-unit to produce a device which, through successive counting and checking operations, approaches a balance point at which a desired output or measurement is obtained. The apparatus is arranged so that a substantial part of the digital control apparatus and the display apparatus is centralized in the control unit.

---

Figure 1A:
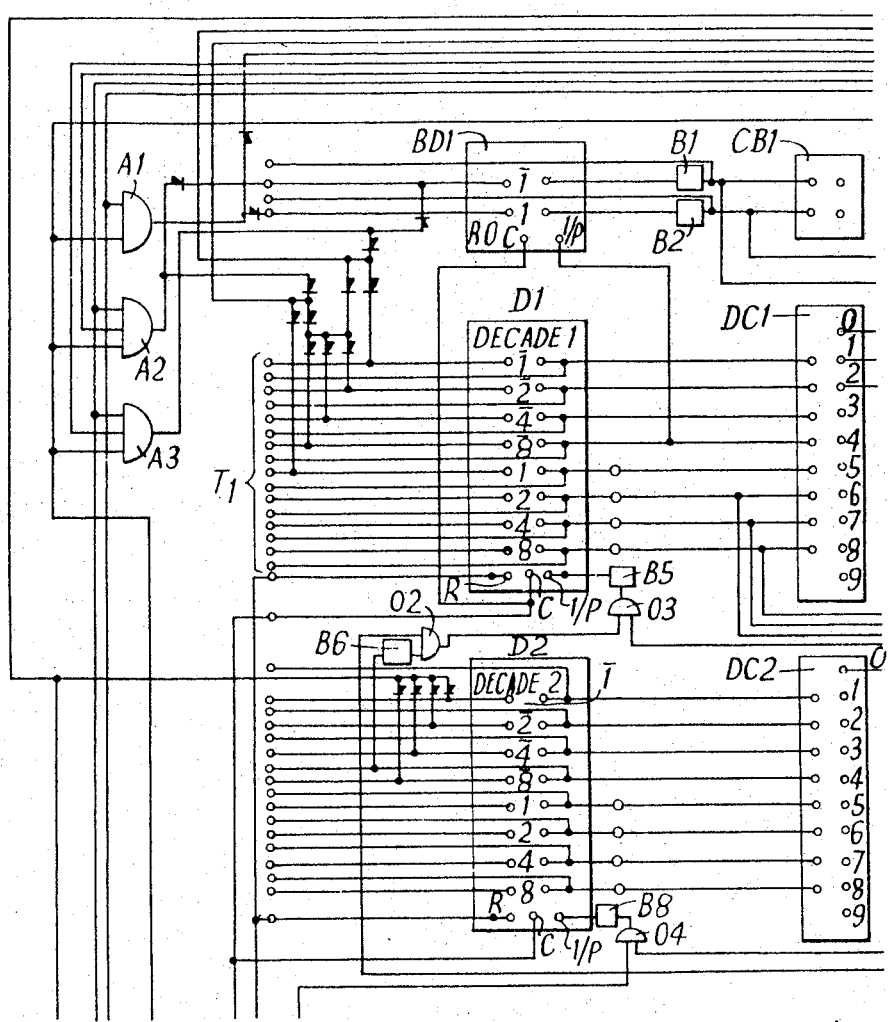
Figure 1B:
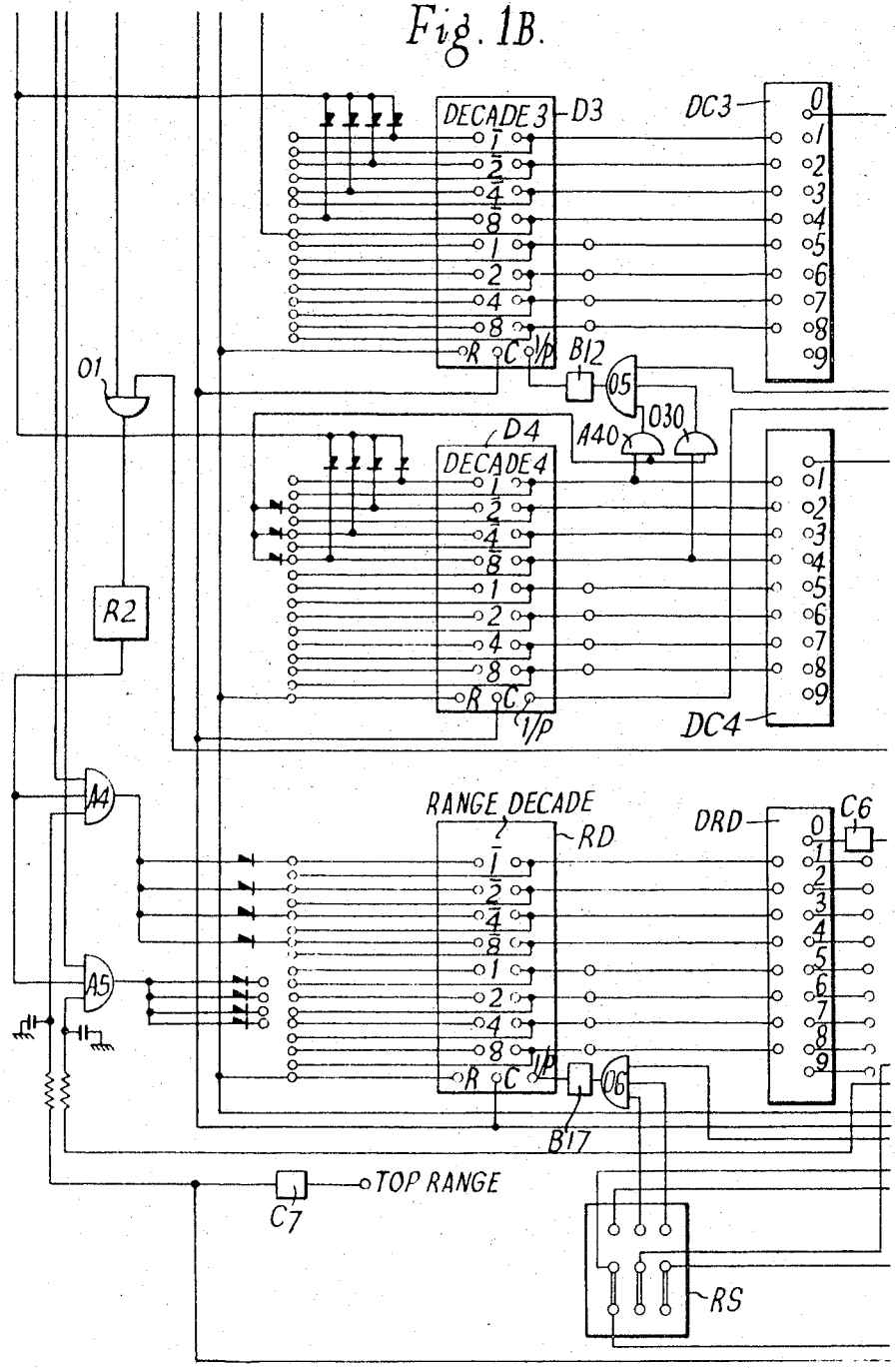
Figure 1C:
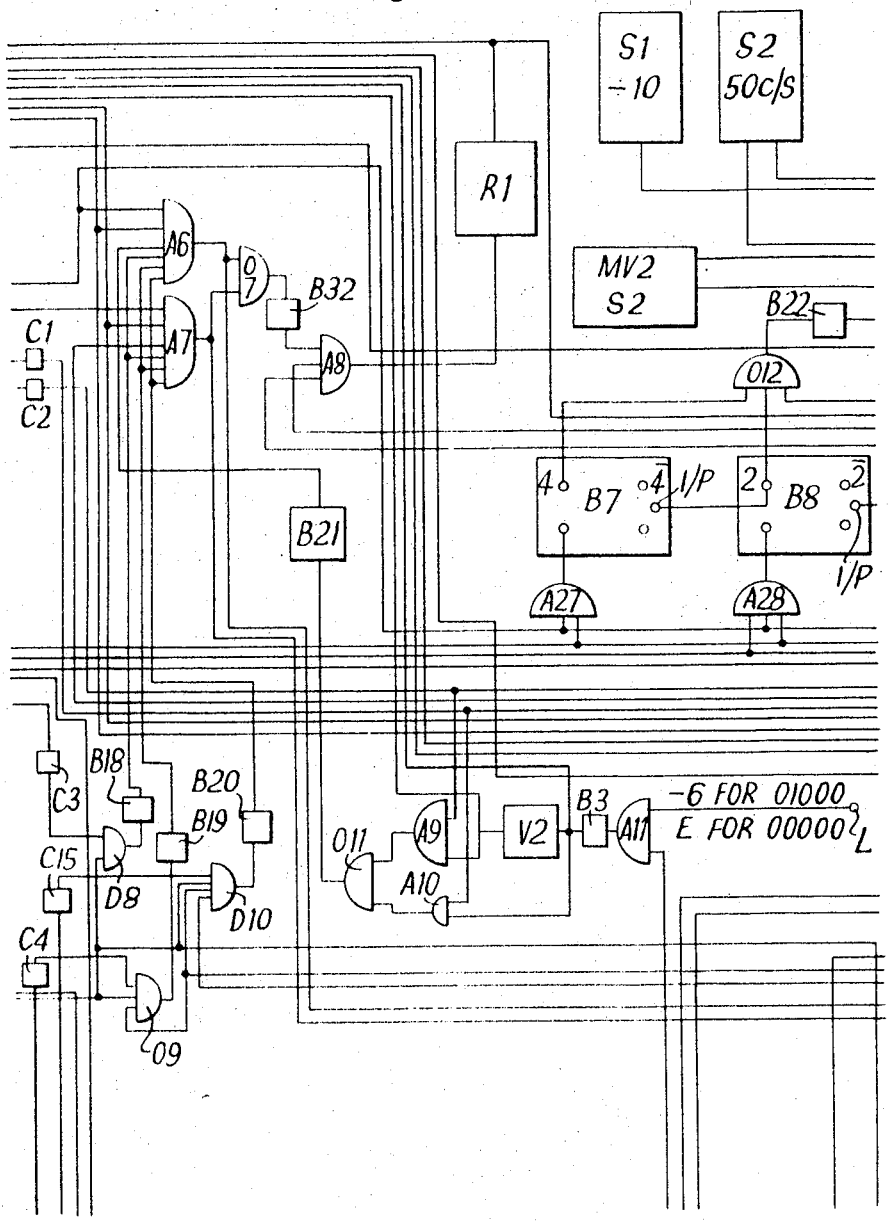
Figure 1E:
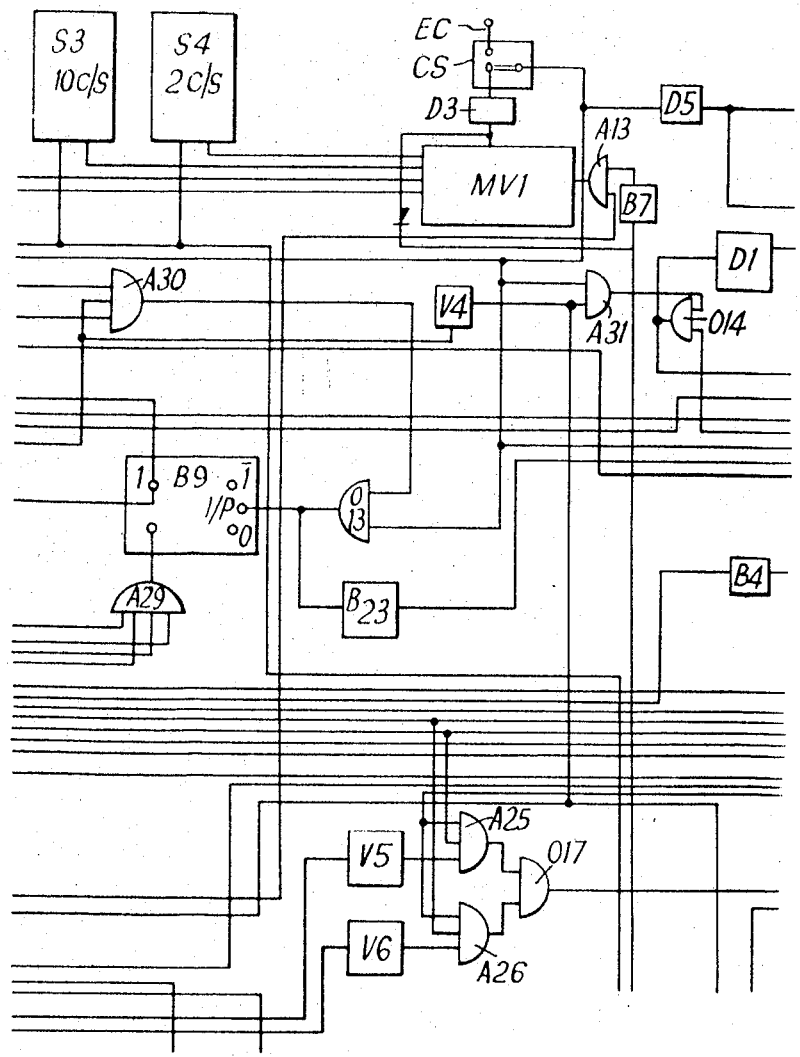
Figure 1F:
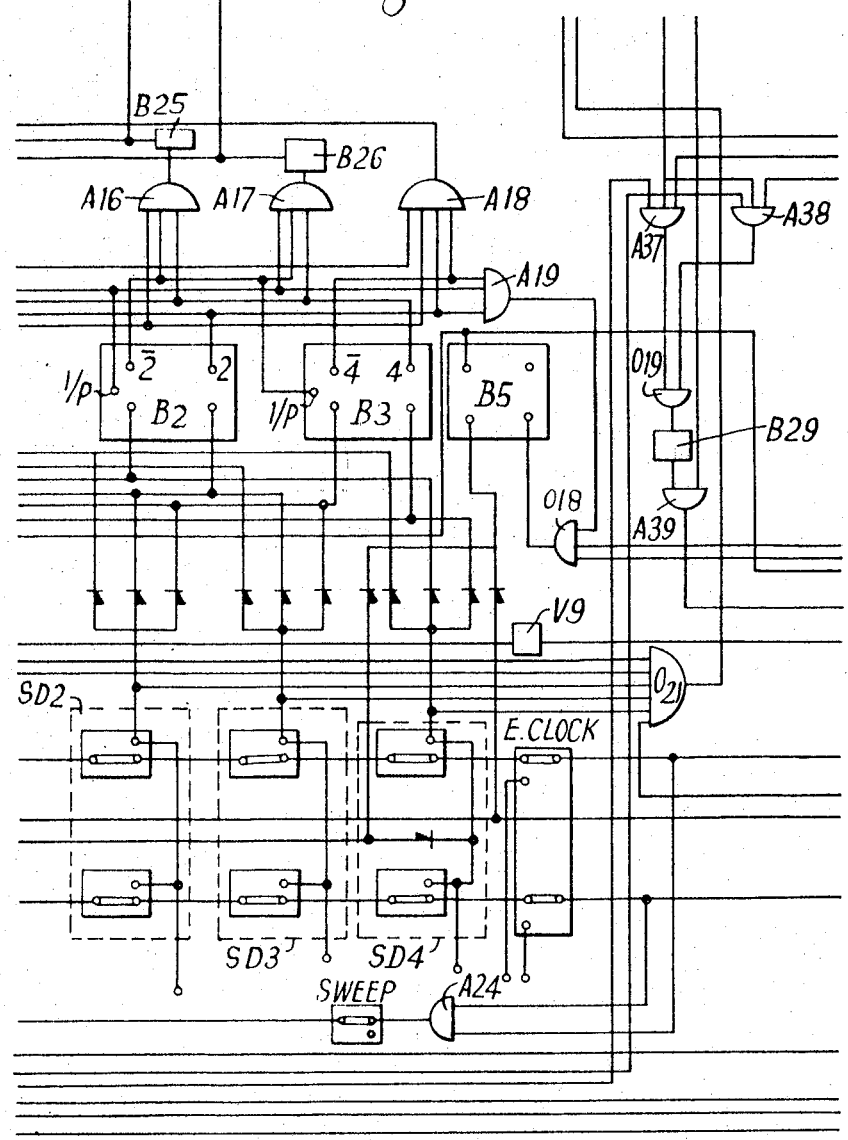
Figure 1G:
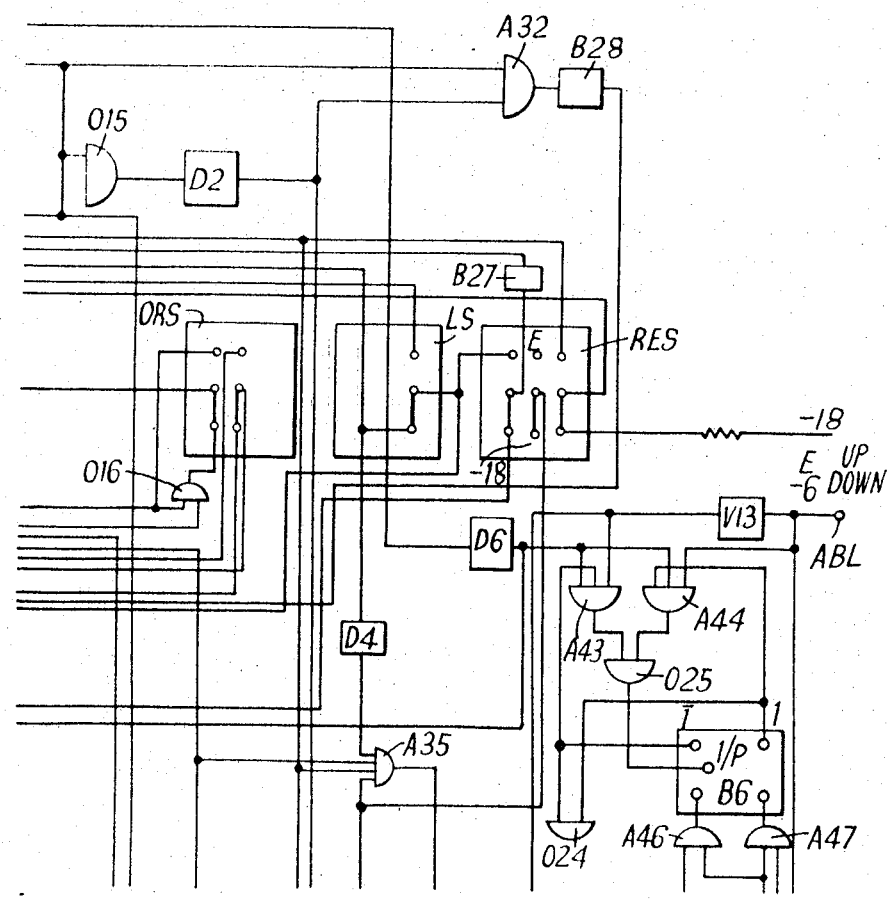
Figure 1H:
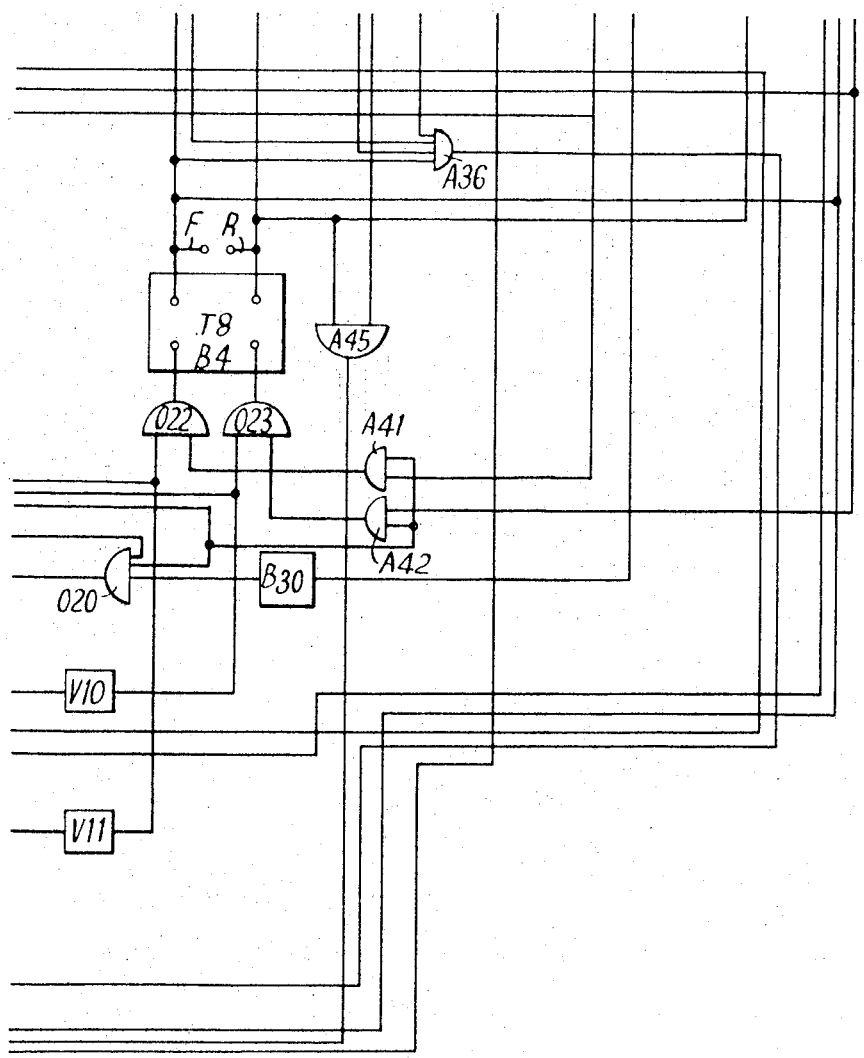

The present invention relates to digital instruments and is concerned with instruments of the type in which a given parameter such as, for example, frequency, resistance or voltage, can be adjusted to any one of a plurality of predetermined values in steps under digital control and with digital indication of value.

Most instruments, such as measuring instruments, in common use are of the analogue type but in recent years some measuring instruments, such as voltmeters, have been manufactured in digital form and have found wide application.

It is considered that other instruments at present in analogue form would find wide acceptance in digital form but the extra cost of an instrument in digital form has deterred industry in this connection. Experience has shown for example that with a selling price of $360.00 for an analogue instrument the selling price for a corresponding digital instrument is about $1,100.00. Thus despite the known advantages of the digital form wide acceptance has not come about.

An object of the present invention is to provide an improved instrument of the type specified embodying facilities whereby, in effect, a range of instruments can be provided at substantially reduced cost.

It is known to adjust a given parameter to any one of a plurality of different values by means of a pulse counter providing coded outputs for controlling selection of the value of the parameter and cycling the pulse counter to a prescribed value indicative of a given value of the parameter.

It is also known to extend or vary the range of an instrument by providing a plurality of different plug-in units, one of which is used at a time. This has been done, for example, to provide different frequency ranges for an oscillator.

According to the present invention, an instrument of the type specified comprises a main structure embodying control apparatus and within the main structure means to receive any one of a plurality of different subsidiary structures adapted to provide parameters of different characters each adjustable by means of the control apparatus to any one of a plurality of different values, the control apparatus including a clock-pulse source connected through control-switch mechanism to a pulse counter adapted to provide coded outputs for controlling the adjustment of the parameter provided by any one of the subsidiary structures when mounted in the main structure, and a digital display device coupled to the counter for displaying the number stored in the counter at any instant. The control-switch mechanism can be manually-operable, or electrically-operable under the control of an input signal applied to the counter for remote control, or both. Thus, the different subsidiary structures hereinafter referred to as plug-in units can, for example, consist of a variable-frequency oscillator, a variable reference-voltage source or a variable resistor whereby a large part of the apparatus is common to all and, in effect, three digital instruments can be provided at a price considerably less than would be the case for three separate and complete instruments.

Figure 3:
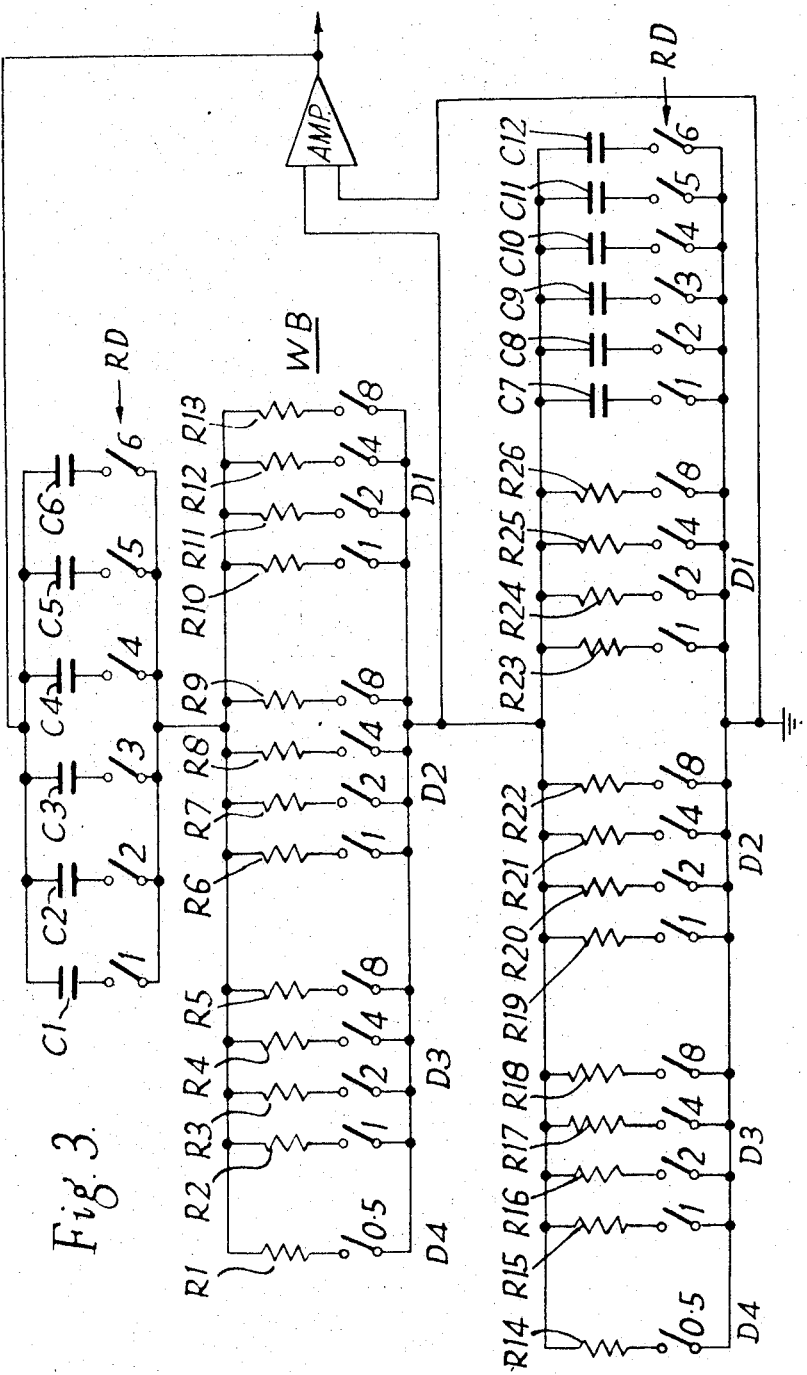
Figure 6:
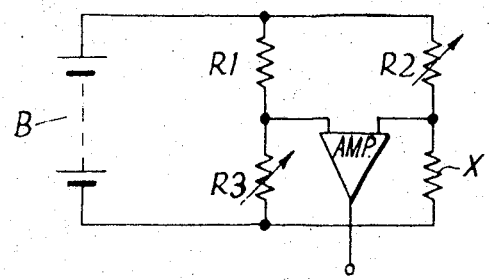
Figure 7:
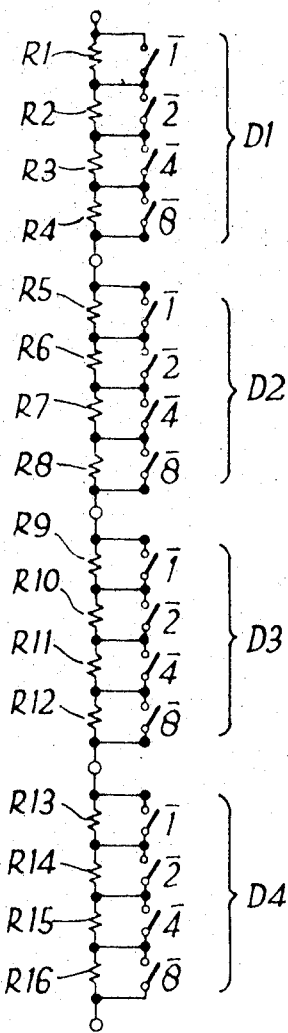
Figure 8:
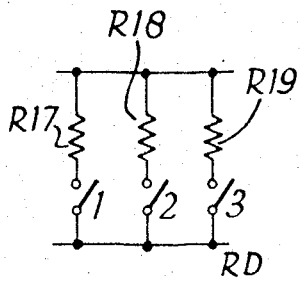
Figure 9:
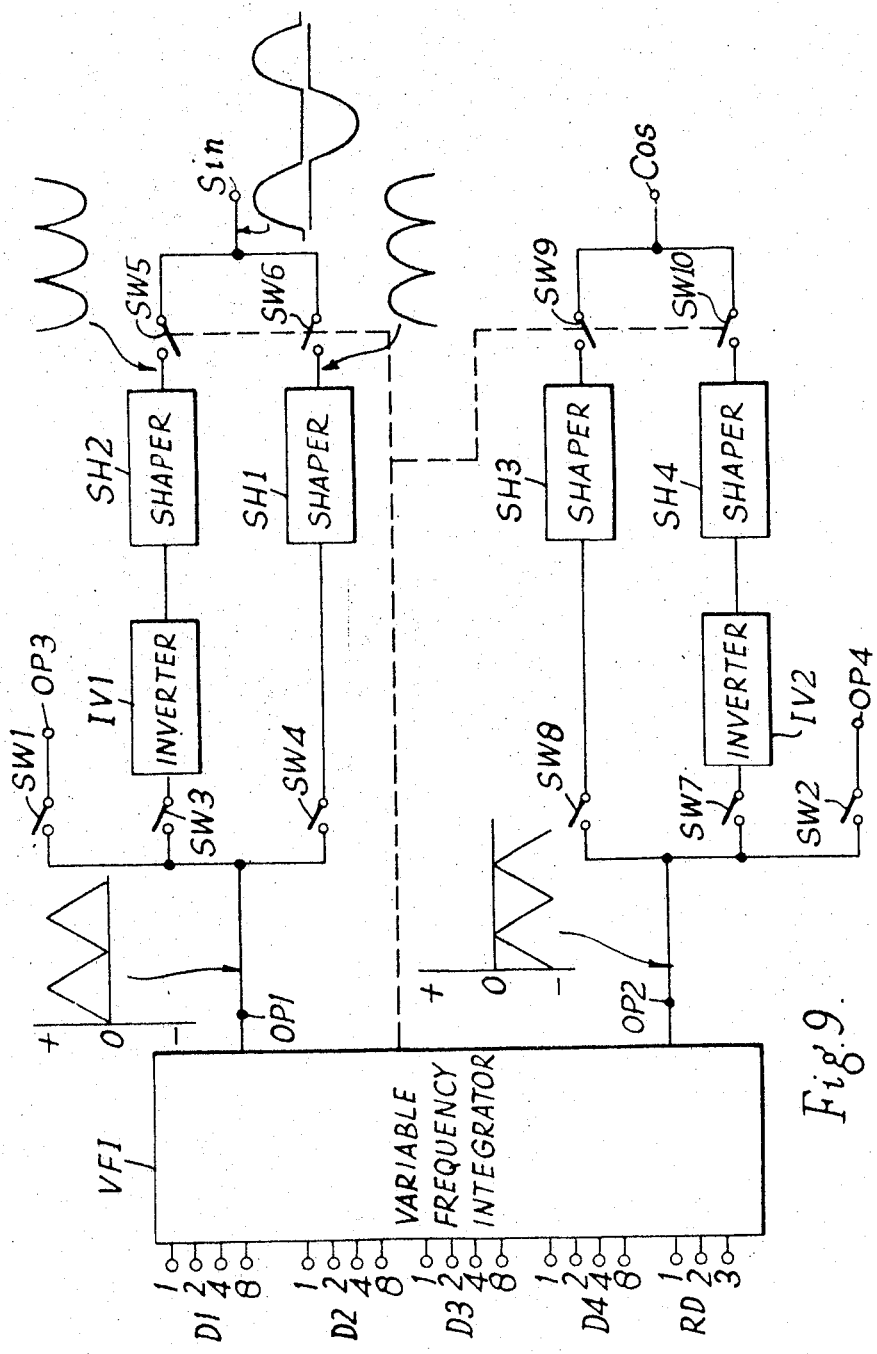
Figure 10:
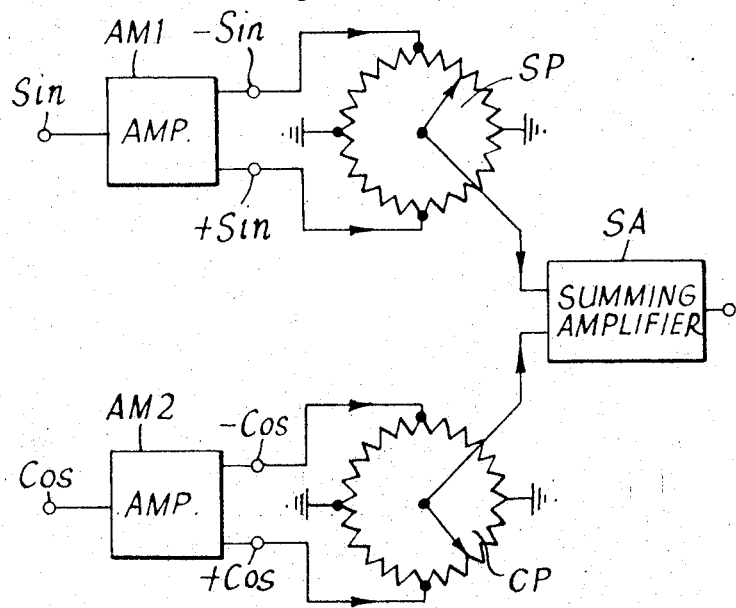
Figure 11:
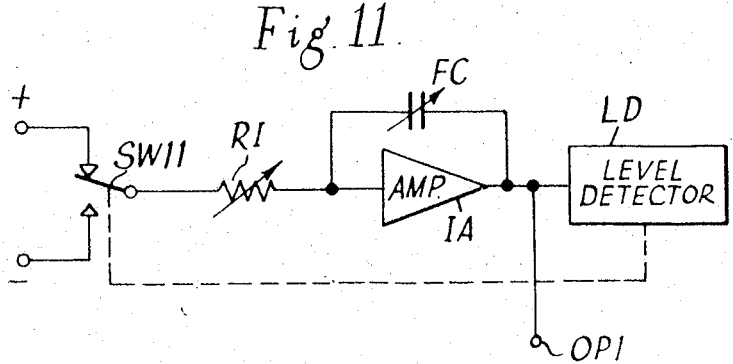
Figure 12:
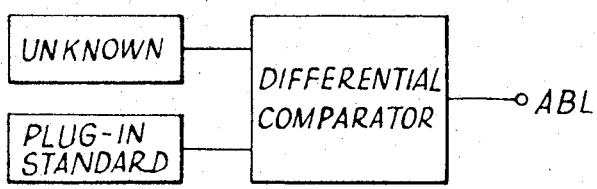
Figure 13:
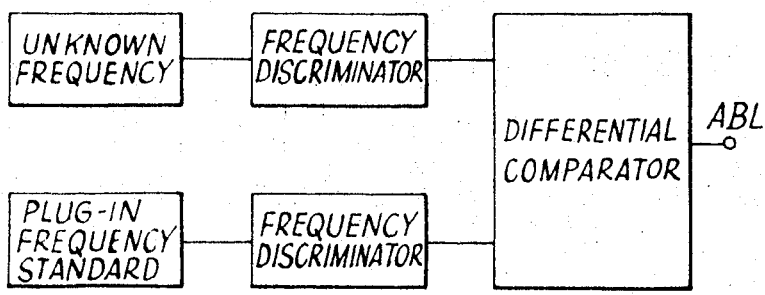
Figure 14:
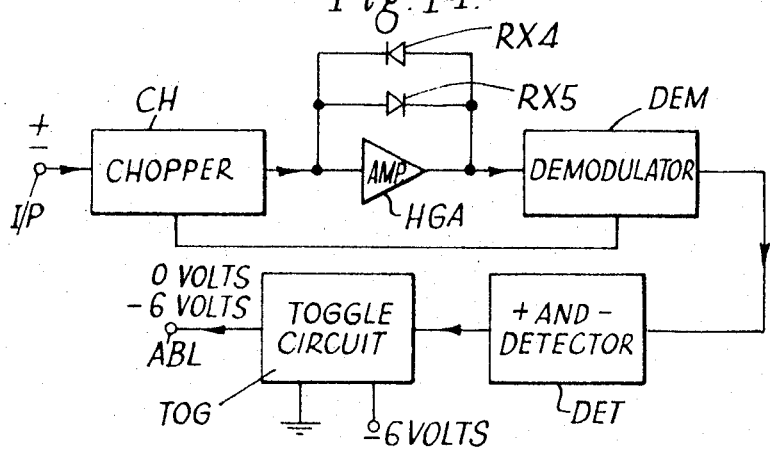

The invention will now be described, by way of example, with reference to the accompanying drawings in which:

FIGS. 1A to 1H are to be assembled in accordance with FIG. 1J and show the circuit diagram of a preferred form of main structure providing digital control and into which a variety of plug-in units can be inserted to have a parameter controlled by the main unit, FIG. 2 shows how a decade-unit of FIGS. 1A and B is connected to a relay in a plug-in unit by means of a plug-and-socket connector, FIG. 3 is a circuit diagram of an oscillator-plug-in unit, FIG. 4 is a circuit diagram of a pulse-delay-plug-in unit, FIG. 5 is a circuit diagram of a noise-analyser-plug-in unit, FIG. 6 is a circuit diagram of a resistor-bridge-plug-in unit, FIGS. 7 and 8 show how resistors in the bridge of FIG. 6 can be varied by the main structure of FIG. 1, FIG. 9 is a circuit diagram of a low-frequency-function-generator plug-in unit, FIG. 10 is a circuit diagram of an addition to FIG. 9, FIG. 11 is a circuit diagram of a part of FIG. 9, FIG. 12 is a block-diagram of a comparing circuit for use as a plug-in unit, FIG. 13 shows a development of FIG. 12, and FIG. 14 is a circuit diagram of a preferred comparator device for use in an automatic balancing routine.

Before proceeding with a detailed description with reference to the drawings a general description of the facilities provided by the embodiment will now be given.

A digital instrument comprises a main structure housing digital control apparatus. The digital control apparatus includes a clock-pulse source connected through manually-operable switching mechanism to a counter register functioning in a binary-decimal code. The switching mechanism could also be operable electrically by means of signals applied to the instrument from a remote source. Associated with the counter-register is a digital display device incorporating Nixie display tubes and providing a numerical display from the counter-register through a suitable converter. The numerical display is in the form of five decimal digits the final digit being 0 to 9 or 0 or 0.5 depending upon the plug-in unit employed.

The switching mechanism is so devised as to enable a flexible and readily controllable manual adjustment of the counter-register to be made.

To this end there is provided a stop-switch, four three-position feed-switches, four stepping-rate switches, an over-range switch, a recycle-switch, a long-switch and a range-sweep switch.

The circuits of these various switches enable the following facilities to be provided:

The four feed-switches are so wired that they govern the feed of pulses to the counter-register for the four least significant digits respectively of the decimal display the least significant being a decimal or the single binary digit display (0.5). The central position of each feed-switch is an off position and the other two positions are both on-positions one of the latter providing an add facility and the other a subtract in relation to the number stored in the counter register.

With a stepping rate switch operative each feed-switch is self-locking. When a stepping rate switch is selected the clock-pulse source runs continuously and the clock-pulses are directed into the desired register by means of the appropriate feed switch. When a feed-switch is operated the number stored in the associated decade in the counter register will be increased, or decreased according to the setting of the switch, with corresponding carry counts to the next significant decade. The rate of increases, or decrease, will be dependent upon which of the stepping-rate switches is operative, and can be set at the rate of 50, 10 or 2 steps per second or any of these rates divided by 10 upon appropriate operation of the stepping-rate switches.

Furthermore the increments can be made linear or logarithmic. With both linear and logarithmic increments the maximum count displayed (coloquially referred to in the art as "full house") can be made 10,000 or 1,000.

In the case of linear increments and a full house of 10,000 the step changes at full house are 0.01% whereas at one tenth of full house they are 0.05%.

In the case of logarithmic increments, steps of substantially constant percentage are provided by operation of the log-switch. Increments up to a given number are then in units; further increments are in groups of 2 to a further given number; further increments are in groups of 4 to another given number; and finally to full house the increments are in groups of 8.

The given numbers at which the changes in increments occur for different full house numbers will be seen from the following table.

| Nominal full house number | 1,000 | 10,000 |
|---|---|---|
| 0.5 counts up to | 0200.0 | N.A. |
| 1.0 counts up to | 0400.0 | 2,000 |
| 2.0 counts up to | 0800.0 | 4,000 |
| 4.0 counts up to | 1,000.0 | 8,000 |
| 8.0 counts up to | N.A. | 10,000 |

N.A.—Not applicable.

Referring now to the operation of the apparatus with the stepping-rate switches inoperative, it is arranged in this condition that the register-counter and hence the display can be primed to set up a given number in it and "inched" to set up a required quantity, whose numerical magnitude may be unknown, in an associated sub-unit e.g. to adjust a resistance to balance a bridge. The feed-switches are not self-locking in this mode and with any one of the four feed-switches made operative for either add or subtract operation the associated display will be increased or decreased at a fixed rate of 5 counts every 2 seconds the least significant also including the binary digit and requiring a count of 20 for a full cycle which therefore takes 8 seconds. Thus with the stepping-rate switches inoperative the display can be primed by operation of each of the feed-switches in turn.

The control of whatever plug-in unit is in place in the main structure is effected by providing outputs from the various stages of the register-counter through connectors to the plug-in unit.

Each plug-in unit is arranged to have whatever parameter it provides varied by means of a matrix of switches arranged in the format of binary-coded-decimal whereby direct selection can be effected in accordance with the number stored in the counter in the main structure. The switches can, for example, be in the form of dry-reed relays.

Thus with the stepping-rate switches inoperative, the parameter concerned can be set-up to the required quantity by operation of each of the feed-switches in turn.

With reference to the plug-in units all range selection and auto-range functions will be determined by apparatus in the plug-in unit itself. However, a part of the logical circuits required can be located in the main strutcure and hence be common to all plug-in units.

For example considering a plug-in unit in the form of an oscillator having a plurality of frequency-ranges and a range-switch providing the following facilities:

CARRY
10–100 c.p.s.
100–1000 c.p.s.
1 kc./s.–10 kc./s.
10 kc./s.–100 kc./s.
100 kc./s.–1 mc./s.
EXTERNAL

This range-switch is arranged to operate in conjunction with the recycle-switch in the main structure. Assuming the recycle-switch to be switched off and the range-switch of the plug-in unit to be set to 100 c.p.s. and the registers initially to be set at 10 c.p.s. when a stepping-rate switch is made operative and, say, the feed-switch of lowest significance is switched to the add-position the oscillator will have its frequency stepped progressively upward until the indicator reaches full house and stops.

With the recycle-switch operative the same action occurs up to full house when the register-counter is re-set automatically to one-tenth full house and continues counting towards full house.

With the range-switch set to the carry position the frequency of the oscillator is swept progressively through all its ranges under the control of the register-counter until full house is reached for the highest range. The sweep will then stop if the recycle-switch is inoperative or will return to one-tenth of the lowest range and begin again if the recycle-switch is operative.

This recycling of a selected range or all ranges can be effected in reverse by appropriate operation of the feed-switch.

For stopping at the end of a selected range and for the recycle and carry conditions the ranging numbers are determined by the over-range-switch and the direction of count (add or subtract).

Operation of the over-range switch increases the full-house numbers from 1,000 and 10,000 to 1,100 and 11,000 respectively. If clock-pulses are fed into decade units of the counter other than the least significant decade unit and a number other than zero exists in the decade units of lower significance, recognition logic is arranged to detect the appearance of 10 or 11 in the two most significant decade units and cause a re-set pulse to be generated and applied to the three least significant decades to set them all to zero.

Some plug-in units may require the facility to count down to "all zeros." This can be effected by incorporating "Inhibit" control in the plug-in units or incorporating the facility in the other controls of the plug-in units. For example in the lowest range only.

Provision can be made for enabling two or more instruments according to the invention to be synchronized. This may be required for example where one is in use as an oscillator and another as a wave analyser.

Access can also be provided to both the analogue and digital circuits in the main structure. A plug-in unit can then be arranged to provide control information whereby a given operation can be automated.

DESCRIPTION OF MAIN STRUCTURE EMBODYING DIGITAL CONTROL APPARATUS

The main structure embodying the digital control apparatus is shown in FIGS. 1A to 1H when assembled as shown in FIG. 1J. This assembly of drawings will be referred to as FIG. 1.

In FIG. 1, D-shaped blocks represent AND-gates or OR-gates, the AND-gates having a reference with A followed by a number, such as A14, and the OR-gates having a reference with O followed by a number, such as O12. Small rectangles with reference B followed by a number, such as B24, represent buffer states and small rectangles with a reference V followed by a number, such as V10 represent inverters. Small rectangles with the reference D followed by a number, such as D1, represent delay devices.

In FIG. 1 a clock-pulse generator is provided in the form of a multivibrator MV1 to which are connected four stepping-rate switches S1, S2, S3 and S4 of which S2, S3 and S4, when operated, provide clock-pulses of 50 c./s., 10 c./s. and 2 c./s. respectively. Operation of the switch S1 divides by 10 the frequency determined by whichever of the stepping-rate switches S2, S3 and S4 is operated. Various ways of obtaining frequency adjustment will be apparent to those skilled in the art and hence none need be described in detail here.

Output from the clock-pulse generator MV1 is applied through D3, a switch LS, A25, A26, O17, a switch RES, B27, O14, D1, A32 and B28 to AND-gates A18, A20, A21 and A22 which are controlled by four feed-switches SD1, SD2, SD3 and SD4 and a Range switch SRD. The control is effected through binary circuits (bi-stables) B1, B2 and B3 as will be described later. The external terminals of the feed-switches are for remote control purposes when required.

By means of the feed-switches and the range switch the feed of clock-pulses to a register-counter embodying a binary counter BD1 and five decade-units D1, D2, D3, D4 and Rd can be controlled. BD1 is to count and register the binary digit 1 or 0 of highest significance and DL to D4 are to count and register the four decimal digits of progressively lower significance. RD is to count and register digits for ranging to be described later.

The counter-registers D1 to D4 and RD operate in binary-decimal code and are connected to Nixie display tubes (not shown) through decoding units DC1 to DC4 and DRD. BD1 is also connected to a Nixie display tube (not shown) through a decoding unit CB1.

Each of the counter-registers has two output terminals for each of its stages, namely terminals 1 and $\bar{1}$, 2 and $\bar{2}$, 4 and $\bar{4}$ and 8 and $\bar{8}$ as shown for example at T or D1. The 1, 2, 4, 8 outputs are for connection through plug-and-socket connectors to plug-in units to be described later.

For over-range, log and recycle operation the three switches ORS, LS and RES respectively are provided and will be described later. In addition for balancing and other operations to be described later two further switches marked START and STOP are provided. A range-sweep switch RS is also provided whereby recycling can be effected over all ranges. The START switch and the switch RS are shown for convenience in FIG. 1 but will always be located in the plug-in units.

OPERATION WITHOUT AUTOMATIC SWEEP

The STOP switch (press-button operated) and the stepping-rate switches over-range switch, log switch and recycle switch are interlocked whereby they are all rendered inoperative by operation of the STOP switch. In this condition there is no output from the clock-pulse generator MV1.

If one of the feed-switches SD1 to SD4 is then operated an earth is applied through the operated switch to a group of three rectifiers such as the group RX1, RX2 and RX3 connected to the feed-switch SD1. These in turn set the binary devices B1, B2 and B3 into a condition appropriate to select the decade unit corresponding to the feed-switch operated. For example operation of SD1 sets the binary device B1 to the 1-state the binary device B2 to the $\bar{2}$-state and the binary device B3 to the $\bar{4}$-state. The outputs of the binary devices B1, B2 and B3 in this state operate an AND-gate A15 of which the output is applied to a further AND-gate A20.

The earth applied to the rectifiers RX1, RX2 and RX3 is also applied through the OR-gate O21 to an AND-gate A13 adjacent the clock-pulse generator MV1. A13 also receives an earth from the START switch and the clock-pulse generator is operated to produce clock-pulses which in this mode are arranged to be at 5 per two seconds.

The clock-pulses pass through the AND-gate A20 to the input terminal I/P of the decade unit D1 which therefore counts at the rate of 5 counts per two seconds either adding or subtracting from the count already registered in it. Forward and reverse (adding and subtracting) control will be described later.

Thus the decade unit D1 can be set to register any desired count and similarly the decade units D2, D3 and D4 can be set to register desired counts by operation of the feed-switches SD2, SD3 and SD4 respectively.

Provision is also made for a "carry" each time a decade unit reaches its maximum count, the carry pulses being fed from the decade units D4, D3 and D2 to the decade units D3, D2 and D1 respectively through OR-gates O5, O4 and O3 which are also used for the application of the clock-pulses from the AND-gates A22, A21 and A20.

Operation of the register-counters in the reverse mode uses the standard complements technique. The determination of forward and reverse operation of the counters is governed by a bi-stable circuit B4 which is set by the actuated feed-switch through an inverter V10 or V11 depending upon whether forward or reverse counting is to be effected. An AND-gate A45 is associated with the bi-stable B4 and has clock-pulses applied thereto from D1 through O15 and D2. When reverse counting is to be effected the operation of B4 opens A45 to the clock-pulses which pass to the terminal C on each decade unit D1 to D4 and the binary unit BD1 for complements operation.

For forward counting the bi-stable B4 is put to the opposite state whereby A45 is blocked to the clock-pulses.

OPERATION WITH AUTOMATIC SWEEP

Operation of any of the stepping-rate switches S1, S2, S3 or S4 over-rides the previously described control through O21 and the clock-pulse generator MV1 is put into continuous operation to provide clock-pulses at a rate determined by the stepping-rate switches.

Operation of one of the feed-switches SD1 to SD4 then directs the clock-pulses into the appropriate register-counter in the manner previously described. Subsequent operation of the STOP switch applies an earth to set the binary-devices B1, B2 and B3 such as to inhibit further feed of clock-pulses to the register-counters.

LIMIT DETECTION

For automatic operation it is necessary to provide detection logic to detect 11,000, 1100.0, 10,000, 1000.0, 01000, 0100.0, 00000 and 0000.0 in the register-counter.

Some simplification is afforded by the fact that some numbers differ from others solely by a decimal point and hence it is only necessary to detect 11,000, 10,000, 01000 and 00000.

In the logic provided the AND-gate A6 detects the bottom limit-number 00000 or 01000 and the AND-gate A7 detects the top limit-numbers 11,000, 10,000.

Dealing firstly with detection of the bottom limit the AND-gate A6 opens when the following conditions are satisfied:

(a) BD1 is set to zero.
(b) Decade unit D1 is set to 1 or 0.
(c) Binary device B4 is set for "reverse" operation.
(d) The decade units D2, D3 and D4 are all set to zero.

For condition (a) BD1 is connected through B2 to A6. For condition (b) the 0 and 1 terminals of the decoder DC1 are connected through C1 and C2 to AND-gates A10 and A9 respectively. Operation of A10 and A9 is governed by the plug-in unit used which applies an earth or −6.0 volts to a terminal L. This terminal is connected through A11 and B3 to A10 and through A11, B3 and V2 to A9. If −6.0 volts are applied the bottom limit detection is of 01000. If 0 volts is applied the bottom limit detection is of 00000. For condition (c) an output is applied from terminal R of the binary device B4 to A6. For condition (d) the outputs of OR-gates 08, 09 and 010 are connected to A6. The 0 terminals of the decoders DC2, DC3 and DC4 are connected to 08, 09 and 010 respectively.

Referring now to detection of the top limit the conditions to be fulfilled for A7 to open are that the two most significant digits shall be 10 or 11, depending upon operation of the over-range switch, and the remaining digits shall all be 0. For these purposes BD1 is connected to A7. The terminals 0 and 1 of DC1 are connected to 016 through C1 and C2 respectively and 016 is connected through the over-range switch ORS and buffer B4 to A7. The outputs of 08, 09 and 010 are connected to A7 and the terminal F of bistable B4 is connected to A7.

There is one further condition for operation of A7 namely that if D2, D3 or D4 is not set to zero then upon operation of a feed-switch other than for the least significant decade a false zero must be presented to A7. For this purpose outputs are provided from B24 to 08, 09 and 010; from B25 to 09 and 010; and from B26 to 010.

The outputs of A6 and A7 are connected through 07 and B32 to A8 which opens upon the occurrence of output from A6 or A7 coincident with no output from A14 and output from D1. When A8 opens a monostable circuit R1 fires and this is used in a manner to be described later.

It will be remembered that the delivery of clock-pulses to the decade units is through a path including A25 and A26. For A26 to be open it requires no output from A7 (V6 inverts) and B4 to be set to forward operation. Thus when A7 opens the delivery of clock-pulses through A26 is cut-off. Similarly for A25 to be open it requires no output from A6 (V5 inverts) and B4 to be set to reverse operation. Thus when A6 opens delivery of clockpulses through A25 is cut-off.

The pulse appearing at the output of the monostable circuit R1 is applied to set the decade units D2, D3 and D4 to zero whereby the display is left in the form 11000 or 10000 depending upon the setting of the over-range switch ORS.

The description given of limit detection is on the assumption that recycling is not required. On operation of the recycling switch RES, A25, A26 and 017 are by-passed through the recycling switch RES, B27 and 014 into D1. Thus delivery of clock-pulses continues and any selected range or all ranges are recycled either forwardly or the reverse as will now be described.

RECYCLE OPERATION

With the recycling switch operated (opposite condition to that shown) any range can be recycled in the forward or reverse direction. The output from the monostable circuit R1 when it fires is fed from R1 through the switch RES to A1, A2 and A3. These three gates are coupled to BD1 and D1 as shown and set them to 10, 11, 00 or 01 depending upon the direction of count and whether over-range operation is being used. For example if forward counting is in use the detection of full house—11,000 or 10,000—fires R1 setting zeros into D2, D3 and D4 as previously described and, through A2, it sets 0 in BD1 and 1 in D1 and the selected range is recycled. Range selection is effected by operation of the feed-switch RD which sets the binary devices B1, B2 and B3 to open A12 through A14 and permit clock-pulses to enter the range decade RD through 06.

RECYCLE OPERATION OVER ALL RANGES (RANGE SWEEP)

With the range-sweep switch RS and the recycle-switch RES operated cycling is effected over all ranges until the limit of the top range or bottom range is reached when the range-decade RD and the register-counter is re-set and recycling occurs.

The range-sweep switch RS connects the outputs of two AND-gates A35 and A36 to the OR-gate 06 at the input of the range-decade unit RD. The inputs to A35 are the "reverse" output from B4, the output of the monostable circuit R1 and clock-pulses. The inputs to A36 are the "forward" output from B4, the output of the monostable circuit R1 and clock-pulses.

Thus whenever full-house or bottom limit is reached in any range R1 fires and through A35 or A36 depending upon the direction of count a pulse is applied to the input of RD through 06.

During reverse counting when 0 is reached in the lowest range a pulse applied from the 0 terminal of DRD to an AND-gate A5 to which the "reverse" output of B4 is applied. This permits a clock-pulse fed from A12 through 01 and R2 to A5 to pass to the unit DRD to reset it to the top range. The same pulse from terminal 0 of DRD passes to A11 and permits resetting of the register-counters.

The top range is determined by the plug-in unit by a connection to the terminal marked "Top range." When a pulse appears on this terminal when the top range is reached it passes through A4 into the unit RD and resets this register to the bottom range for recycling. The other inputs to A4 are the "forward" output of B4 and clock-pulses from A12 through 01 and R2.

AUTOMATIC BALANCE

It is desirable, by means of suitable plug-in units, to be able to measure unknown parameters such as, for example, voltages and resistances. This is accomplished by comparing with the unknown a succession of progressively increasing (or decreasing) standards provided by the plug-in unit under the control of the control apparatus in the main structure. When the comparator in the plug-in unit runs through its balance point it directs the logic concerned in the main structure to try less significant decade units until finally balance is reached or the nearest approach to balance is reached in the least significant decade unit.

To carry out this operation the over-range switch ORS, the range-sweep switch RS, the recycle switch RES and one of the stepping-rate switches are made operative.

The START switch is then operated and applying an earth through RS to B1, B2 and B3 causes them to be set up in conditions such that A14 is opened and opens A12 to clock-pulses. These pass to the range-decade unit Rd which is operated by them. At the same time a binary-device B5 is operated by the START switch into a state such that AND-gates A41 and A42 are primed thereby. A41 and A42 act through 022 and 023 to control the forward and reverse bi-stable B4.

In the plug-in unit the comparator provides an output of −6.0 volts or earth to the terminal ABL (auto-balance-line) if the standard is too low or too high respectively. ABL is connected direct to A42 and through an inverter V13 to A41. ABL is also connected direct to A44 and through V13 to A43. A43 and A44 are connected through 025 to B6. The other inputs to A43 and A44 are clock-pulses from D5 through D6 and the 1 and 1̄ outputs B6. The latter are also applied through 024, B30, 020, V9 and 031 to the input terminal I/P of B1 whereby the bi-stables B1, B2 and B3 can be operated in the serial mode in dependence upon the output of B6. The circuit A43, A44 and B6 serves to sample the state of balance once in each clock-pulse period and whenever balance is crossed the bi-stables are advanced in their settings to steer clockpulses into the next lower decade-unit of the register-counter. This process continues until the least significant decade is at the nearest approach to balance. The next cross-over pulse opens A19 through the bi-stables B1, B2 and B3 and, via 018, B5 is returned to its original state and automatic balancing operation ceases.

For example, assume the unknown to have the value Range 2 09653 and the register-counter to be initially in the setting Range 3 08352, that is above the unknown, when the START switch is depressed. Because the register is set higher than the unknown the signal at ABL is such as to cause B4 to be set in the "reverse" state. The range decade-unit RD is stepped once in reverse to register Range 2. The register setting is now below the unknown, that is Range 2 08352.

The signal at ABL is therefore reversed causing B4 to be put in the forward condition and the pulse applied to the bistables B1 B2 B3 sets them to the next state in which clock-pulses are directed into D1. This counts forward to 10, that is above the unknown—Range 2 10352.

Again the signal at ABL is reversed, B4 is put into "reverse" and B1 B2 B3 are set to direct clock-pulses into D2. D2 counts down and on passing through zero a carry pulse is passed to D1 returning the count of 10 back to 9. D2 continues counting down until it registers 6 giving a total of Range 2 09652 which is below the unknown.

The signal at ABL again reverses putting B4 into "forward" operation and setting B1 B2 B3 to steer clockpulses into D3. D3 counts one pulse which gives a total of Range 2 09662 which is higher than the unknown and the signal at ABL again reverses.

This puts B4 into "reverse" and sets B1 B2 and B3 to steer clock-pulses into D4 which counts down. On passing through zero a carry pulse from D4 to D3 reduces the count in D3 to 5 and D4 continues counting down until it registers 2 when again the signal at ABL reverses.

This opens A19 causing B5 to revert to its initial condition and arresting operation.

Thus against a true value of Range 2 09653 operation of the apparatus is arrested at a value of Range 09652 and a close measurement of the unknown has been made.

It will be realized that if the value of the unknown lies in, say, the top and the registers D1–D4 are in an initial setting which is below the value of the unknown in the top range the signal at ABL will still call for a range increase after the top range has been reached. For example assume the unknown to have a top-range value of Range 4 9999 and the registers D1 to D4 to be set to 9998. Initially the range decade is stepped upwardly as described until the value Range 4 9998 is reached. The signal at ABL would then call for an increase to Range 5 9998 but Range 4 is the top range and RD can be stepped no further.

Similarly if the value of the unknown is in the bottom range and D1 to D4 are initially set to a value above the unknown in the bottom range the signal at ABL will call for a range setting below the bottom range.

A circuit is embodied in FIG. 1 to deal with these circumstances and includes the AND-gates A37 and A38, the OR-gate 019 with buffer B29 and AND-gate A39 which feeds into OR-gate 020.

The AND-gates A37 and A38 have inputs from B31 at the output of A14 and hence are primed only when the range-decade RD is in operation. A second input to A37 is from the terminal Top Range and a second input to A38 is from the terminal 0 (bottom range) on the decoder DRD. A third input to A37 is direct from ABL and a third input to A38 is from ABL via V13.

Thus if the top range is reached and the signal at ABL calls for a yet higher range A37 opens and activates A39. Clock-pulses are fed to A39 from D6 and hence a clockpulse passes through A39 and 020 to set B1, B2 and B3 for delivering pulses into D1 and cutting-off delivery to RD. D1 is then counted up until the signal at ABL indicates "reverse" and thereafter the action for automatic balancing is as already described.

Similarly if the signal at ABL were to call for a range below the bottom range A38 opens and hence permits a clock-pulse to pass through A39 resetting B1, B2 and B3 and directing the clock-pulses from RD to D1.

LOG OPERATION

In log operation it is arranged that the ranges are swept logarithmically, that is for a constant pulse rate in the pulses supplied by MV1 the register-counters "move" logarithmically.

The principal parts of the circuit concerned are the log switch Ls, the log-sweep multivibrator MV2, binary counters B7, B8 and B9 together with A27, A28, A29, A30, 012 and 013.

Operation of LS breaks the previously described route for clock-pulses from MV1 to A25 and A26. The route is now from MV1 through 013, B23 and LS to A25 and A26.

The log-sweep multivibrator MV2 is of a frequency of approximately 50 kc./s.

The output of MV2 is also for use as clock-pulses but through A30. A30 is normally closed and is opened only when B9, B8 or B7 is put to the 1-state. Serial operation of B9, B8 and B7 is provided for through the input terminal I/P on B9 and proceeding from B9 to B8 to B7 as shown. Over-riding parallel operation of B9, B8 and B7 is provided by the AND-gates A29, A28 and A27 respectively. These are coupled as shown to D1 whereby A29 closes on a count of 2,000, A28 closes on a count of 4,000, and A27 closes on a count of 8,000.

Assuming initially that the register is set to all zeroes, and that stepping-rate selection is effected by operation of S1, S2, S3 or S4, A27, A28 and A29 are open whereby the counters B7, B8 and B9 are held by the over-riding control and A30 is closed.

The clock-pulses provided by MV1 pass through 013 but cannot operate B9 because of A29 being open. The clock-pulses pass through B23 and LS to A25 and A26 and normal operation as hereinbefore described takes place.

When a count of 2,000 is reached A29 closes and the next pulse from MV1 in addition to operating the register-counter turns-over B9 thereby opening A30 and allowing an extra pulse from MV2 to pass through 013 and operate the register-counter. The same pulse from MV2 applied to B9 returns B9 to its initial state.

This action continues in which each pulse from MV1 is followed by an extra pulse from MV2 until a count of 4,000 is reached. At this level A28 closes releasing B8 for operation.

The next pulse from MV1 in addition to operating the register-counter turns over B9 and in the manner already described allows an extra pulse from MV2 to pass A30 and be counted. Now however B8 is also released and is operated in the serial mode from B9 whereby a total of three extra pulses pass through A30 and are counted.

This action continues to the "full-house" condition when A27 also closes. Thereafter each pulse from MVI is followed by seven pulses from MV2 through A30 which is opened for a count of seven by the binary counter B9, B8 and B7.

This action continues until a count of 8,000 is reached when the register counter is reset and the cycle starts again.

To facilitate location of the components on the various sheets of FIG. 1A–H, the following table is provided:

AND gates:                                          FIG. 1 sheet
   A1 _____ A
   A2 _____ A
   A3 _____ A
   A4 _____ B
   A5 _____ B
   A6 _____ C

| AND gates: | FIG. 1 sheet |
|---|---|
| A7 | C |
| A8 | C |
| A9 | C |
| A10 | C |
| A11 | C |
| A12 | D |
| A13 | E |
| A14 | D |
| A15 | D |
| A16 | F |
| A17 | F |
| A18 | F |
| A19 | F |
| A20 | D |
| A21 | D |
| A22 | D |
| A24 | F |
| A25 | E |
| A26 | E |
| A27 | C |
| A28 | C |
| A29 | E |
| A30 | E |
| A31 | E |
| A32 | G |
| A35 | G |
| A36 | H |
| A37 | F |
| A38 | F |
| A39 | F |
| A40 | B |
| A41 | H |
| A42 | H |
| A43 | G |
| A44 | G |
| A45 | H |
| A46 | G |
| A47 | G |

| Buffers (small rectangles): | FIG. 1 sheet |
|---|---|
| B1 | A |
| B2 | A |
| B3 | C |
| B4 | E |
| B5 | A |
| B6 | A |
| B7 | E |
| B8 | A |
| B12 | B |
| B17 | B |
| B18 | C |
| B19 | C |
| B20 | C |
| B21 | C |
| B22 | C |
| B23 | E |
| B24 | D |
| B25 | F |
| B26 | F |
| B27 | G |
| B28 | G |
| B29 | F |
| B30 | H |
| B31 | D |
| B32 | C |

| Buffers (small rectangles): | FIG. 1 sheet |
|---|---|
| B1 | D |
| B2 | F |
| B3 | F |
| B4 | H |
| B5 | F |
| B7 | C |
| B8 | C |
| B9 | E |

| Monostable: | FIG. 1 sheet |
|---|---|
| R1 | C |

| OR gates: | FIG. 1 sheet |
|---|---|
| 01 | B |
| 02 | A |
| 03 | A |
| 04 | A |
| 05 | B |
| 06 | B |
| 07 | C |
| 08 | C |
| 09 | C |
| 010 | C |
| 011 | C |
| 012 | C |
| 013 | E |
| 014 | E |
| 015 | G |
| 016 | G |
| 017 | E |
| 018 | F |
| 019 | F |
| 020 | H |
| 021 | F |
| 022 | H |
| 023 | H |
| 024 | G |
| 025 | G |
| 030 | B |
| 031 | D |

| Delay devices: | FIG. 1 sheet |
|---|---|
| D1 | E |
| D2 | G |
| D4 | G |
| D5 | E |
| D6 | G |

| Decade units: | FIG. 1 sheet |
|---|---|
| D1 | A |
| D2 | A |
| D3 | B |
| D4 | B |
| DRD | B |

| Decoding units: | FIG. 1 sheet |
|---|---|
| DC1 | A |
| D2 | A |
| D3 | B |
| D4 | B |
| DRD | B |

| Switches: | FIG. 1 sheet |
|---|---|
| LS | G |
| RES | G |
| ORS | G |
| CS | E |
| SRD | D |
| SD1 | D |
| SD2 | F |
| SD3 | F |
| SD4 | F |
| E CLOCK | F |
| RS | B |
| START | D |
| STOP | D |
| S1 | C |
| S2 | C |
| S3 | E |
| S4 | E |

| Rectifiers: | FIG. 1 sheet |
|---|---|
| RX1 | D |
| RX2 | D |
| RX3 | D |

Terminals:                                    FIG. 1 sheet
  L ........................................... C
  F ........................................... H
  R ........................................... H
  ABL ......................................... G
  TOP RANGE ................................... B
  EC .......................................... E
  $T_1$ ....................................... A

EXTERNAL FACILITIES

The base electrodes and collector electrodes of all the binaries in the register-counter are connected to individual sockets at the rear of the unit for example as shown at $T_1$ whereby the state of the registers can be checked by an outside device or they can be set to any state by outside control.

The multivibrator MV1 can be switched out of circuit by means of a switch CS and an external clock-pulse generator connected in by the switch CS from a terminal EC.

PLUG-IN UNITS—GENERAL DESCRIPTION

Each plug-in unit embodies a multi-point connector for making connections between the plug-in unit and the main structure described with reference to FIG. 1. The connector is arranged for making connections to all the output terminals of the decade units D1 to D4, RD and BD1 or such as may be required for operation of the plug-in unit concerned. Other connections to terminals such as ABL are also made depending upon the plug-in unit employed.

In the plug-in units dry-reed relays are controlled by BD1, D1 to D4 and RD in the main structure to effect digital selection of the parameters concerned. Each stage in each decade-unit of the main structure embodies a transistor and the winding of the corresponding reed relay in a plug-in unit which is in position is connected through the multi-point connector to the collector of the transistor.

FIG. 2 shows the manner of connection referred to in relation to stage 1 of the decade D4. The terminal of output 1 of stage 1 is connected through a connector of the multi-point connector MP to the coil of a dry-reed relay DR. The contacts of the relay DR are shown connected, in this instance, across a resistor R but of course they might equally be in series with R.

For simplification in drawings relating to the several plug-in units to be described, however, only the relay contacts will be shown. These will carry the notation appropriate to the decade-unit controlling them from the main structure.

OSCILLATOR PLUG-IN UNIT

FIG. 3 is a circuit diagram of an oscillator in the form of a Wein Bridge oscillator embodying an amplifier AMP and a Wien-bridge WB connected in the positive feedback-path to determine the frequency of oscillation.

Six frequency ranges are selectable by selection of appropriate capacitors from the groups C1 to C6 and C7 to C12. Selection of the range capacitors is effected under the control of the range-decade RD in the main structure as indicated by the references RD in FIG. 3 followed by the numerals 1 to 6 indicating relay contacts. These are in decimal code and control in decimal code can be achieved by relay connections to the decoder DRD in the main structure.

Digital control of frequency in each range is effected in 2000 steps. The hundreds tens and units are governed by the decade units D1 to D3 respectively and a binary (0.5) step by D4 in the main structure.

For this purpose the resistances of the Wien bridge are adjusted in steps and in the upper section of the bridge thirteen resistors R1 to R13 are provided. These are arranged in groups consisting of R1 for the binary (0.5) steps controlled by decade unit D4, R2 to R5 for the "units" steps controlled by D3, R6 to R9 for the "tens" steps controlled by D2 and R10 to R13 for the "hundreds" steps controlled by D1.

In the lower section the resistors are arranged in like groups R14, R15 to R18, R19 to R22, and R23 to R26 which are likewise controlled by D4 to D1 respectively in the main structure.

It will be appreciated therefore that by operation of the main unit the oscillator of FIG. 3 can be set to any desired one of its frequencies. Furthermore any range can be continuously cycled or all ranges can be swept or continuously recycled.

CRYSTAL DELAY PLUG-IN UNIT

Referring to FIG. 4 this shows a crystal-delay plug-in unit which enables an output pulse to be generated in response to an applied pulse after a time delay determined by the settings of the decade units in the main structure.

In FIG. 4 a crystal-clock CC is connected through an AND-gate A100 to five counters 10 to 14 arranged for serial operation from the clock CC. These five counters correspond to the decade units BD1, D1, D2, D3 and D4 respectively in the main structure.

In addition the counters 10 to 14 can be set in the parallel mode to any desired setting. For this purpose the terminal 1 on the counter 10 is connected by the multi-point connector to BD1 in the main structure. Similarly the terminals 1, 2, 4 and 8 on the counters 11 are connected to the corresponding terminals on the decade units D1 to D4 respectively in the main structure.

An AND-gate A101 is connected to the 1-outputs of the counters 10 to 14 to detect a full-house of 11111 and provide an output pulse at an output terminal O/P by way of a pulse-shaper PS1.

An input terminal I/P is connected through a pulse-shaper to the AND-gate A100.

In operation a trigger pulse applied at I/P causes a lengthened pulse to appear in the output of the pulse-shaper PS2. This lengthened pulse opens the AND-gate A100 to clockpulses from the clock CC which pass into the counters 5–15 until count of 11111 is reached in the counters. This condition is detected by the AND-gate A101 which causes an output pulse to appear at O/P.

In one example the crystal clock CC has a frequency of $10^8$ c./s. whereby the maximum delay from a starting condition of 00000 in the counters 10–14 is $11111/10^8$ second.

If, however, the counters are initially set to a count of N by means of the decade-units in the main structure the delay is shortened to $(11111-N)/10^8$.

Thus the complement of the required delay (in relation to 11111) is set into the counters 10–14 which are then operated in response to the trigger pulse to provide the delay required.

The pulse shaper PS2 must obviously provide a pulse equal to the maximum delay of $11111/10^8$ second.

NOISE ANALYSER PLUG-IN UNIT

Referring to FIG. 5 an input terminal I/P is connected through a tunable filter TF to a wide-band amplifier and rectifier AR. This is followed by a log converter LC to connect the output of AR into logarithmic form for display in decibel form on a meter M.

By applying a "noise" signal to I/P and varying the tuning of the filter TF the amplitude of the noise components at different frequencies is indicated on the meter M as each frequency is reached.

As indicated in FIG. 5 the frequency to which the filter TF is tuned is determined by the decade units in the main structure. This can be adjusted manually by the feed-switches or swept until an output is indicated on the meter.

The filter TF can take any suitable form but preferably is an active Wien-bridge filter controlled as described with reference to FIG. 4.

The selectivity of the filter is set manually which in the case of the Wien-bridge active filter is readily effected by adjusting the gain of the amplifier.

Two or more filters may be connected in series in which case all filters are tuned simultaneously to the same frequency. Preferably three are connected in cascade.

RESISTANCE-BRIDGE PLUG-IN UNIT

The basic circiut of a resistance-bridge plug-in unit is shown in FIG. 6 and consists of two ratio arms R1 and R2 of which R2 is variable in steps for range selection. The standard resistance, variable in steps is shown at R3 and the unknown to be measured is shown at X. DC for operation of the bridge is provided by a battery B and detection of balance is provided by a differential amplifier AMP.

A suitable form of the variable standard resistance is shown in FIG. 7 in which 16 resistors R1 to R16 arranged in four groups R1–R4, R5–R8, R9–R12 and R13–R16. Each resistor has relay contacts connected across it and the four groups of relays are controlled by the decade-units D1 to D4 in the main unit as indicated in FIG. 7.

Thus the value of resistance from zero up to a maximum is dependent upon the settings of the decade units D1 to D4 in the main structure.

FIG. 8 shows a suitable form for the range-resistor R2 of FIG. 6 and comprises three resistors R17, R18 and R19 which can be selected individually for operation under the control of the range decade-unit RD in the main structure.

PLUG-IN UNIT FOR LOW-FREQUENCY FUNCTION GENERATOR

Referring to FIG. 9 this shows the circuit of a low-frequency function generator suitable for generating functions such as triangular waves, sine waves and cosine waves at digitally controlled frequencies under the command of the main structure.

The function generator comprises a variable-frequency integrator VFI which provides two triangular waves at OP1 and OP2 respectively. The triangular wave at OP1 has a lower limit of zero volts whereas the triangular wave at OP2 has an upper limit of zero volts whereby the two waves are in effect phase-displaced by 90°. Otherwise they are identical.

By means of a switch SW1 the triangular wave at OP1 can be fed to an output terminal OP3.

By means of a switch SW2 the triangular wave at OP2 can be fed to an output terminal OP4.

By closing switches SW3 and SW4 the triangular wave at OP1 can be fed to an inverter IV1 and a shaper SH1. The output of IV1 is fed to a shaper SH2.

Each of the shapers SH1 and SH2 are arranged to derive approximately a half-cycle of a sinusoidal wave from each of the triangular waves applied thereto whereby rectified sine-waves of opposite polarities appear at the outputs of the two shapers.

These waves are applied through two switches SW5 and SW6 to an output terminal Sin. The switches SW5 and SW6 are arranged to function in anti-phase and in synchronism with the triangular waves so that alternate negative half-cycles from SH2 are combined with the intervening positive half-cycles from SH1 and provide a sine-wave at the terminal Sin.

In like manner a cosine wave can be delivered at the terminal Cos by means of the switches SW7, SW8, SW9 and SW10, inverter IV2 and shapers SH3 and SH4.

Referring now to FIG. 10 this shows the terminals Sin and Cos of FIG. 9 connected to two amplifiers AM1 and AM2 respectively which provide outputs of −Sin and +Sin, and −Cos and +Cos as shown. The Sin outputs are applied to a sine potentiometer SP and the Cos outputs are applied to a cosine potentiometer CP. The outputs from the wipers of SP and CP are added in a summing amplifier SA.

The sine and cosine potentiometers are ganged whereby adjustment thereof provides an output from the amplifier of variable phase.

The variable-frequency integrator VFI can be as shown in FIG. 11 in which an integrator is shown having an input resistor RI, an amplifier IA and a capacitor FC between the output and input of the amplifier. This is a standard form used for integrators. The voltage feed to the input resistor is positive or negative from the terminals + or − depending upon the setting of a switch SW11. This is governed by a level detector LD.

When in operation with positive-going output the output to LD reaches a predetermined positive value, say +15 volts, it operates the switch SW11. The output then proceeds at the same rate towards zero and LD detects zero when it is reached and again operates SW11. The output appears at OP1.

The output for OP2 in FIG. 9 can readily be obtained by backing the voltage at OP1 against a bias of −15 volts.

The frequency of operation of the integrator in FIG. 11 can readily be varied by an arrangement for RI identical with FIG. 7. Coarse adjustment of frequency can be made by an arrangement for FC the same as in FIG. 8 substituting capacitors for the resistors R17, R18, R19.

AUTOMATIC-BALANCING

The automatic balancing facility already described with reference to FIG. 1 is particularly suitable for use with plug-in units embodying a bridge for measuring unknowns.

However it is not limited to such plug-in units and has other applications.

Basically the circuit required is as shown in FIG. 12.

The known and unknown can be of any parameter such as resistance, capacitance or inductance in which case a bridge method such as that already described is preferable.

Other parameters such as frequency can be measured, however, in which case conversion from frequency to direct voltage is effected by means of frequency discriminators and the direct voltages are compared. This is illustrated in FIG. 13. In FIGS. 12 and 13 the terminal ABL is for connection to ABL of FIG. 1.

To provide the "high" and "low" signals of zero and −6 volts to ABL it is preferred to use a comparator as shown in FIG. 14.

The input at I/P can have extremely small values especially when a bridge providing the input approaches balance. To deal adequately with such inputs a chopper CH is provided followed by a high-gain amplifier HGA provided with limiting feedback through oppositely poled rectifiers RX4 and RX5.

The output of HGA is demodulated in a phase-sensitive demodulator DEM and the high and low conditions are detected by a detector DET. This is followed by a toggle circuit TOG which applies earth or −6 volts to ABL in dependence upon its setting.

It will be apparent to those skilled in the art that many other plug-in units can be devised for dealing with parameters under the digital control of the main unit.

I claim:

1. A digital instrument comprising a plurality of sub-units each having first connector means for accepting coded input signals for said sub-unit and for providing output signals; a main control unit having second connector means for electrically contacting and cooperating with said first connector means of a selected one of said sub-units to form a complete instrument; said main control unit comprising a clock pulse source; a pulse counter; and a plurality of control switch means for interconnecting said pulse source and said counter to provide a coded output at said second connector means; each of said sub-units including a plurality of circuit elements and a plurality of relay means for selecting portions of said circuit elements for connection in circuit with said first and second connector means, said relay means being selectably energized by said coded output to connect said portions of said circuit elements to said main control unit; said main control unit further comprising a digital display device connected to said pulse counter for displaying the count stored therein at any instant.

2. An instrument according to claim 1, and wherein said pulse counter comprises a plurality of counter units of progressively increasing digit significance, and said plurality of control switch means includes logic circuit means for directing the clock-pulses into any one of the counter units.

3. An instrument according to claim 2, wherein said logic circuit means includes a plurality of AND-gates connected between the clock-pulse source and the respective counter units and manually-operable feed-switches whereby said AND-gates can be selectively opened to feed clock-pulses to the associated counter units.

4. An instrument according to claim 3, wherein a feed-counter having a plurality of binary stages is connected between said feed-switches and said AND-gates, said feed-counter being connected for parallel operation by the feed-switches to provide outputs to control the AND-gates in dependence upon the setting of the feed-counter as determined by the feed-switches.

5. An instrument according to claim 4 wherein said pulse counter is a bidirectional counter for forward and reverse counting and said control-switch means includes apparatus for controlling the pulse counter to selectively count in forward or reverse.

6. An instrument according to claim 5, wherein said logic circuit means includes recycling control means for detecting a top limit of count or bottom limit of count and to reset the pulse counter for a further count to the top limit or the bottom limit.

7. A digital instrument comprising a plurality of sub-units each having first connector means for accepting coded input signals for said sub-unit and for providing output signals; a main control unit having second connector means for electrically contacting and cooperating with said first connector means of a selected one of said sub-units to form a complete instrument, said main control unit comprising a clock pulse source; a pulse counter; and a plurality of control switch means for interconnecting said clock pulse source and said counter to provide a coded output at said second connector means; each of said sub-units including a plurality of circuit elements and a plurality of relay means for selecting portions of said circuit elements for connection in circuit with said first and second connector means, said relay means being selectably energized by said coded output to connect said portions of said circuit elements to said main control unit; said main control unit further comprising a digital display device connected to said pulse counter for displaying the count stored therein at any instant; and conversion apparatus for producing logarithmic operation of said pulse counter in response to a linear sequence of clock pulses, said conversion apparatus comprising means for sensing a plurality of different accumulated counts in said pulse counter spaced from one another in ascending magnitudes; a second pulse source of a higher frequency than said clock pulse source; and means for injecting pulses from said second pulse source into said pulse counter, said means for sensing being responsive to the accumulation of counts of ascending magnitudes to cause injection of increasing numbers of pulses into said pulse counter.

8. A digital instrument comprising a plurality of sub-units each having first connector means for accepting coded input signals for said sub-unit and for providing output signals; a main control unit having second connector means for electrically contacting and cooperating with said first connector means of a selected one of said sub-units to form a complete instrument; said main control unit comprising a clock pulse source; a pulse counter; and a plurality of control switch means for interconnecting said pulse source and said counter to provide a coded output at said second connector means; each of said sub-units including a plurality of circuit elements and a plurality of relay means for selecting portions of said circuit elements for connection in circuit with said first and second connector means, said relay means being selectably energized by said coded output to connect said portions of said circuit elements to said main control unit; said main control unit further comprising a digital display device connected to said pulse counter for displaying the count stored therein at any instant; and balancing means for providing signals to the selected plug-in unit to select components in the unit to provide a matching standard for automatic measurement of an unknown parameter, said balancing means comprising circuit means for adjusting the accumulation in said pulse counter by successive approximations to establish in the counter a value corresponding to the unknown under control of comparator signals from said plug-in unit.

9. Apparatus according to claim 8 wherein each said plug-in unit includes relays with operating windings arranged for connection to the pulse-counter through said connectors, said relays having contacts connected to circuit elements in said plug-in unit for determining the magnitude of a parameter in dependence upon the setting of the pulse counter.

References Cited
UNITED STATES PATENTS

| | | | |
|---|---|---|---|
| 2,996,666 | 8/1961 | Baker | 235—151.31 X |
| 2,977,535 | 3/1961 | O'Connor et al. | 235—151.31 X |
| 3,153,193 | 10/1964 | Caldwell. | |
| 3,246,240 | 4/1966 | Arnold et al. | |

MALCOLM A. MORRISON, Primary Examiner

J. F. RUGGIERO, Assistant Examiner

U.S. Cl. X.R.

235—150.3; 324—99; 340—347